United States Patent
Kimura et al.

(10) Patent No.: US 6,208,600 B1
(45) Date of Patent: Mar. 27, 2001

(54) METHOD AND DEVICE FOR RECORDING DATA IN AN OPTICAL MEMORY CARD

(75) Inventors: Yasuyuki Kimura, Hiki-gun; Akira Onodera, Kawagoe, both of (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 09/101,746

(22) PCT Filed: Nov. 10, 1997

(86) PCT No.: PCT/JP97/04081

§ 371 Date: Jul. 10, 1998

§ 102(e) Date: Jul. 10, 1998

(87) PCT Pub. No.: WO98/21717

PCT Pub. Date: May 22, 1998

(30) Foreign Application Priority Data

Nov. 11, 1996  (JP) .................................................... 8-298782

(51) Int. Cl.$^7$ ...................................................... G11B 7/00
(52) U.S. Cl. ............................. 369/54; 369/59; 369/275.3
(58) Field of Search .................................. 369/124.1, 59, 369/58, 54, 48, 47, 275.3

(56) References Cited

U.S. PATENT DOCUMENTS

| | | | | |
|---|---|---|---|---|
| 4,831,611 | * | 5/1989 | Sasaki et al. ........................... | 369/58 |
| 4,962,301 | * | 10/1990 | Rokutan ................................. | 369/59 |
| 5,276,667 | * | 1/1994 | Tsutsui et al. ......................... | 369/59 |
| 5,291,463 | * | 3/1994 | Ichikawa et al. ....................... | 369/13 |
| 5,315,575 | * | 5/1994 | Akatsuka ............................. | 369/44.13 |
| 5,380,996 | * | 1/1995 | Horiguchi ........................... | 369/44.28 |
| 5,850,382 | * | 12/1998 | Koishi et al. ..................... | 369/275.3 |
| 5,978,338 | * | 11/1999 | Nakamura ............................. | 369/59 |
| 6,031,814 | * | 2/2000 | Nagata et al. ..................... | 369/275.3 |

FOREIGN PATENT DOCUMENTS

| | | |
|---|---|---|
| 5841444 | 3/1983 | (JP) . |
| 58-165163 | 9/1983 | (JP) . |

* cited by examiner

*Primary Examiner*—Nabil Hindi
(74) *Attorney, Agent, or Firm*—Hogan & Hartson, LLP.

(57) ABSTRACT

A method and a device for recording data in an optical memory card which facilitate judgment between an unrecorded region and a recorded region in the optical memory card and which prevent double writing. Record pits are formed so that data to be recorded on the optical memory card is recorded in the same way as when recorded in the MFM-RZ modulation system. Data that was recorded in the NRZI-RZ modulation system is reproduced and the modified to record in the MFM-RZ modulation system. This method forms the record pits at least every two recording intervals or less in the recorded region in the optical memory card, making it possible to judge the unrecorded region of the optical memory card from the recorded region according to presence or absence of the record pits and thereby preventing double writing.

4 Claims, 9 Drawing Sheets

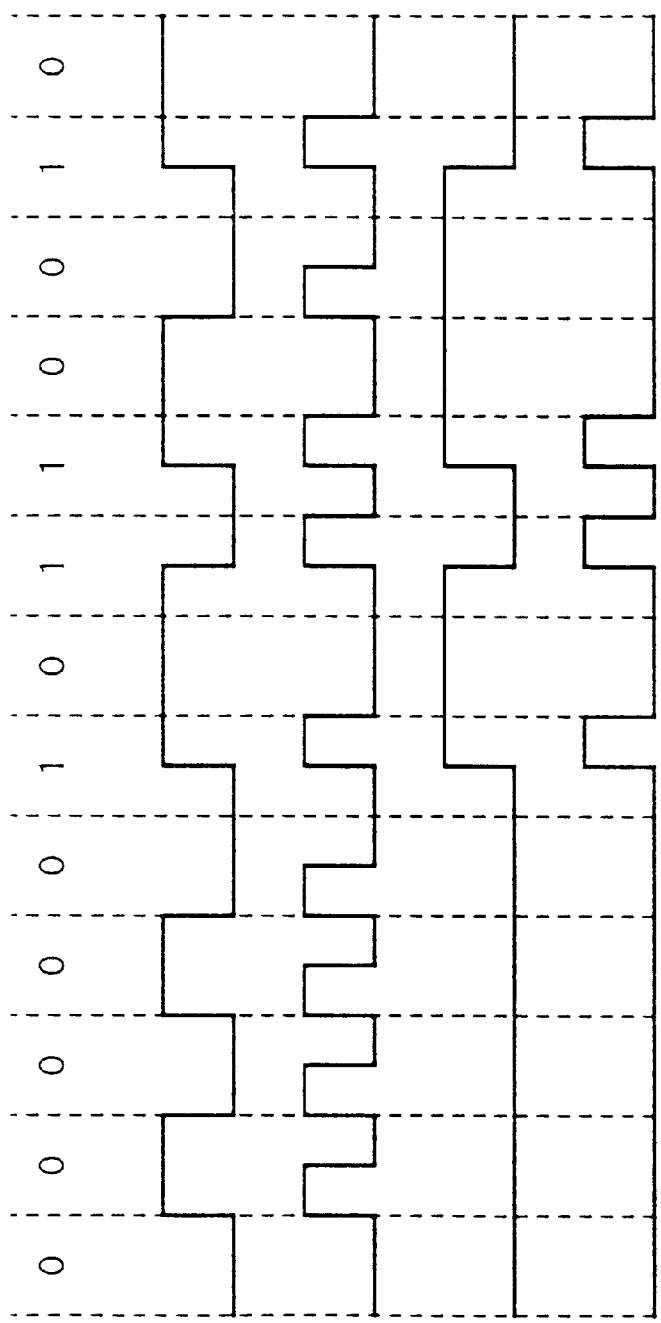

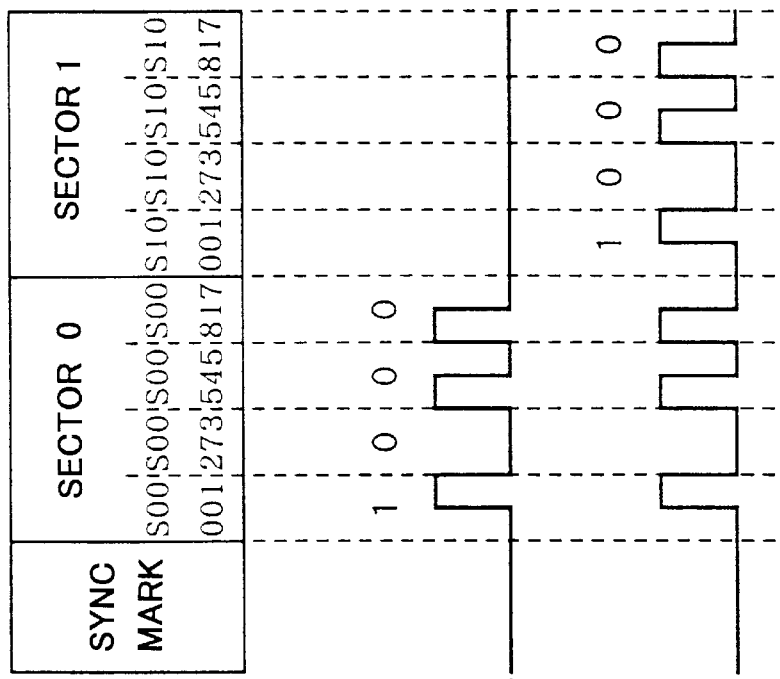
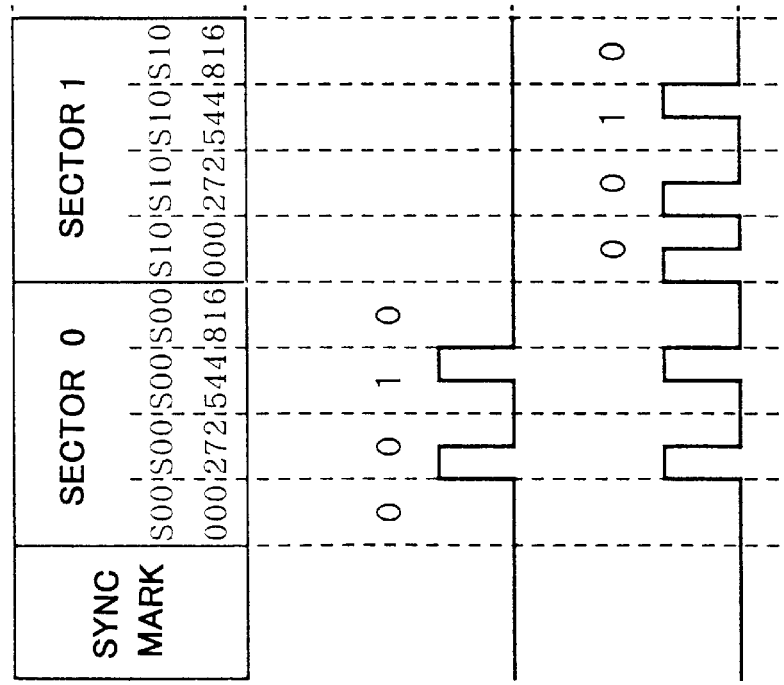
FIG.4(a)
FIG.4(b)
FIG.4(c)

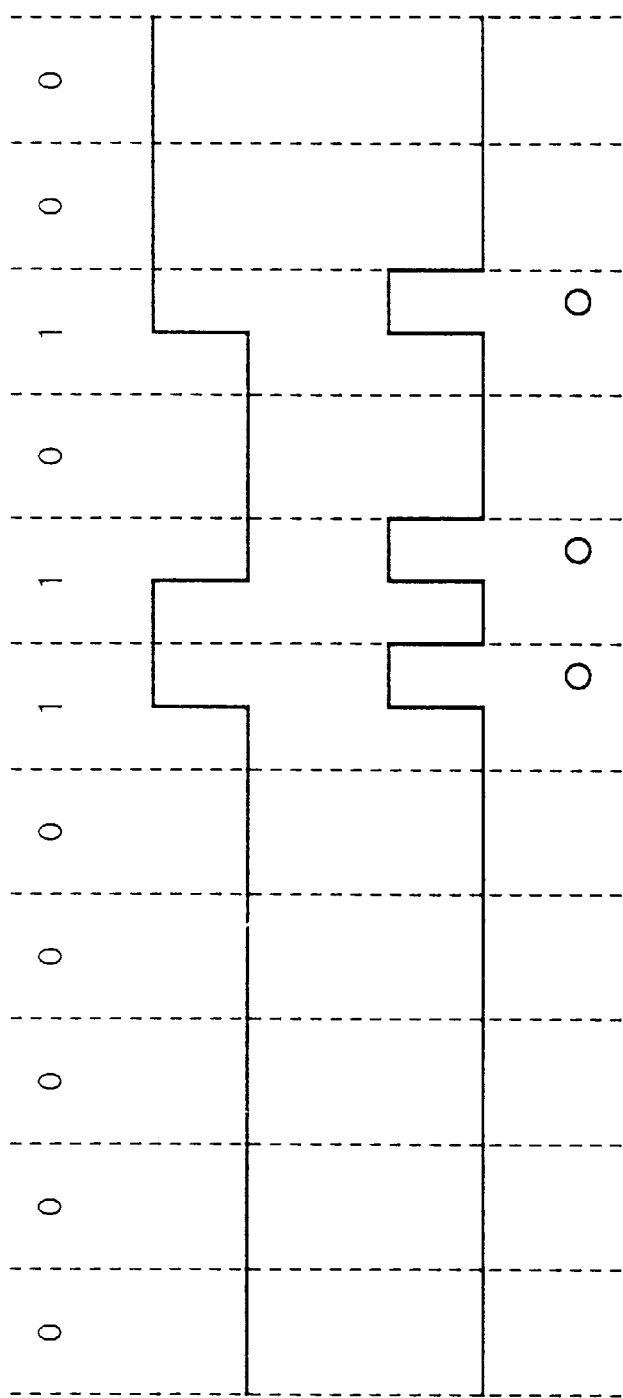

METHOD AND DEVICE FOR RECORDING DATA IN AN OPTICAL MEMORY CARD

TECHNICAL FIELD

The invention relates to a method and a device for recording data in an optical memory card, and more particularly to a method and a device for recording data in an optical memory card, that records data so as to form at least one record pit between two data records in a recording region of the optical memory card in order to improve a function of judging between an unrecorded region and a recorded region of the optical memory card, thereby preventing double writing.

BACKGROUND ART

Generally, the optical memory card is a plastic card and can record and reproduce data in its recording region with a laser beam.

FIG. 7 shows a recording region 102 of an optical memory card 101. As shown in its enlarged diagram, data recording tracks 103 for recording information and guide tracks 104 formed at given intervals required for tracking control for stabilizing a radiating position of the laser beams for recording and reproducing are alternately disposed on the recording region 102.

The data recording tracks 103 and the guide tracks 104 have a different reflection ratio. Comparing the reflection ratio of these two, the data recording tracks 103 have a higher reflection ratio and the guide tracks 104 have a lower reflection ratio.

And, a record pit 105 is a portion having a low reflection ratio, which is formed in the data recording tracks 103, with the laser beam to record information. The presence or not of the record pit 105 indicates information to be recorded.

FIG. 8 shows a logical data structure of the recording region 102. On the recording region 102, read-in 111 provided for an unillustrated optical memory card reader/writer to realize a bit synchronization at the time of recording or reproducing and an SYNC mark 112 for the unillustrated optical memory card reader/writer to realize a frame synchronization at the time of recording or reproducing have been recorded, in addition to a data recording region 110 where information is recorded.

The read-in 111 has the SYNC mark 112 recorded and record pits 105 formed at given intervals.

An optical memory card reader/writer (not shown) is provided with a synchronization signal generator (not shown), scans the optical memory card 101 at a scan rate so that a synchronization signal output from the synchronization signal generator agrees with a signal which rises for every one bit detected by scanning the read-in 111, and keeps the same scan rate to make bit synchronization.

And, the SYNC mark 112 is formed of record pits 105, which are arranged in a pattern not produced by modulation, and used when the unillustrated optical memory card reader/writer gets frame synchronization.

The frame is a bit separation to process a signal by a signal processing circuit in the unillustrated optical memory card reader/writer. The unillustrated optical memory card reader/writer is provided with a counter (not shown) for obtaining frame synchronization. The counter counts the synchronization signal, outputs a frame synchronization signal after counting up to the number of bits configuring one frame, and resets its counted number.

Since the SYNC mark 112 is recorded at the start end (or termination end) of the frame, the unillustrated optical memory card reader/writer scans the optical memory card 101. And when the SYNC mark 112 is detected, the number indicated by the unillustrated counter for obtaining frame synchronization is reset, thereby assuring the acquisition of frame synchronization.

And, the data recording region 110 has the SYNC mark and n sectors 113 arranged as indicated by a data recording region 110-1 on each frame. The sector 113 is composed of a single or a plurality of bits.

FIG. 9 is a diagram showing an NRZI-RZ (nonreturn-to-zero change on 1-return to zero) modulation system for converting data, which is recorded in a conventionally used optical memory card, into the presence or not of a record pit.

The NRZI-RZ modulation system is a modulation system to produce a pulse at a polarity reversion position of an NRZI (nonreturn-to-zero change on 1) modulation system.

When data shown in FIG. 9(a) is modulated, the NRZI modulation system reverses the polarity of a signal at the bit midpoint of data "1" as shown in FIG. 9(b).

Accordingly, the NRZI-RZ modulation system generates a pulse at a polarity reversion position of FIG. 9(b) as shown in FIG. 9(c).

Data modulated by the NRZI-RZ modulation system is recorded by forming a record pit in the recording region of the optical memory card so as to correspond to the position of the pulse as shown in FIG. 9(d).

As apparent from FIG. 9(a) and FIG. 9(d), the NRZI-RZ modulation system does not form a record pit on a part where data "0" is continuous.

However, before recording data on the optical memory card, the optical memory card reader/writer reproduces the optical memory card to detect the presence or not of a record pit. Thus, it judges between an unrecorded region and a recorded region of the optical memory card to prevent double writing on it. Therefore, if data to be recorded in the optical memory card has a portion where data "0" is continuous, a record pit is not formed on the optical memory card while data "0" is continuing. And, it becomes hard to judge between the unrecorded region and the recorded region, resulting in degrading a function of preventing double writing from being made by the optical memory card reader/writer.

SUMMARY OF THE INVENTION

Under the circumstances described above, it is an object of the invention to provide a method and a device for recording data in an optical memory card, which records data by a modulation system which forms a record pit even when data to be recorded has data "0" which continues, and changes the modulation system of a card recorded by the NRZI-RZ modulation system, to facilitate judgment between an unrecorded region and a recorded region of the optical memory card, thereby keeping a function of preventing double writing from being made by an optical memory card reader/writer.

In order to achieve the above object, the invention relates to a method of recording data in an optical memory card, in which data is recorded in such a manner as to form at least one record pit between two data records in a recording region of the optical memory card.

The recording region of the optical memory card comprises one-bit sectors in one frame, the data is modulated by an NRZI-RZ modulation system to record it in a sector for recording data and to reproduce a sector adjacent to the sector for recording data, and if the adjacent sector has been recorded and the record pit has not been formed in both the sector for recording data and the adjacent sector, a record pit is formed on a boundary between the sector for recording data and the adjacent sector.

The recording region of the optical memory card comprises plural-bit sectors in one frame, the data is modulated by an MFM-RZ modulation system to record it in a sector for recording data and to reproduce a sector adjacent to the sector for recording data, and if the adjacent sector has been recorded and the record pit has not been formed in both the sector for recording data and a record position in contact with a boundary of the adjacent sector, a record pit is formed on a boundary between the data-recorded sector and the adjacent sector.

The data is reproduced when the recording region of the optical memory card has data recorded by the NRZI-RZ modulation system, and the record pit is formed on a boundary of the record positions so as to modify to record by the MFM-RZ modulation system when the recording region of the optical memory card has continuous record positions where the record pit has not been recorded.

The invention also relates to a device for recording data in an optical memory card, which comprises means for recording data in such a manner as to form at least one record pit between two data records in a recording region of the optical memory card.

The recording region of the optical memory card comprises one-bit sectors in one frame, and wherein the recording device comprises means for modulating the data by an NRZI-RZ modulation system to record it in a sector for recording data, means for reproducing a sector adjacent to the sector for recording data, and means for forming the record pit on a boundary between the sector for recording data and the adjacent sector if the adjacent sector has been recorded and the record pit has not been formed in both the sector for recording data and the adjacent sector.

And, the recording region of the optical memory card comprises plural-bit sectors in one frame, and wherein the recording device comprises means for modulating the data by an MFM-RZ modulation system to record it in a sector for recording data, means for reproducing a sector adjacent to the sector for recording data, and means for forming the record pit on a boundary between the sector for recording data and the adjacent sector if the adjacent sector has been recorded and the record pit has not been formed in both the sector for recording data and a record position in contact with a boundary of the adjacent sector.

Besides, the data recording device further comprises means for reproducing the data when the recording region of the optical memory card has data recorded by the NRZI-RZ modulation system, and means for forming a record pit on a boundary of the record positions so as to modify to record by the MFM-RZ modulation system when the recording region of the optical memory card has continuous record positions in which the record pit has not been recorded.

BRIEF DESCRIPTION OF THE DRAWINGS

FIGS. 3(a) to 3(e) are diagrams showing an example of data modulation by an MFM-RZ modulation system;

FIGS. 4(a) to 4(c) are diagrams showing an embodiment to record data on sectors of a plurality of bits in one frame;

FIGS. 9(a) to 9(d) are diagrams showing an example of data modulation by the NRZI-RZ modulation system.

BEST MODE FOR CARRYING OUT THE INVENTION

A method and device for recording data in an optical memory card according to the invention will be described with reference to the accompanying drawings.

Figure 1:
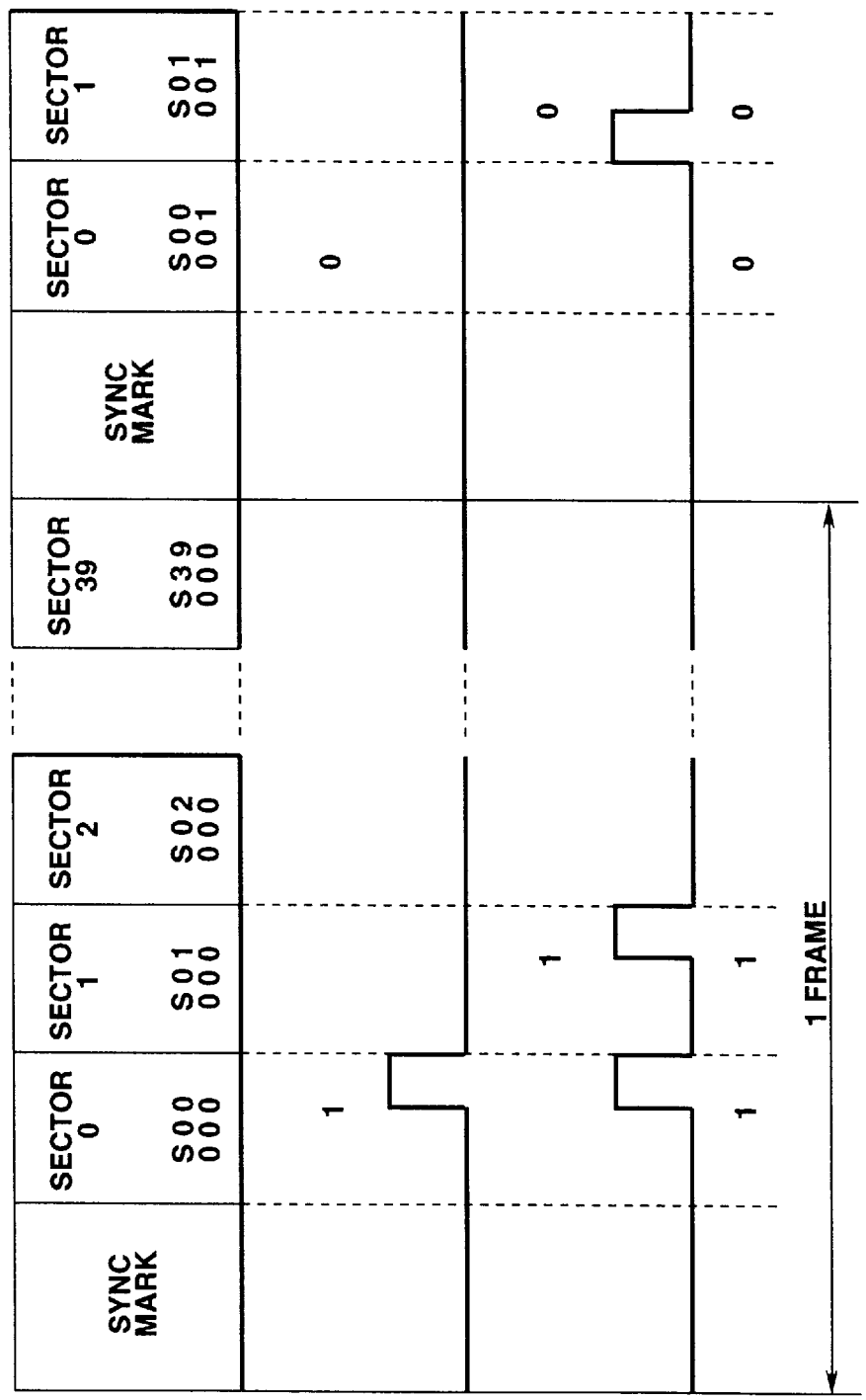
FIGS. 1(a) to 1(c) are diagrams showing an embodiment to record data on sectors of one bit in one frame.
Figure 2:
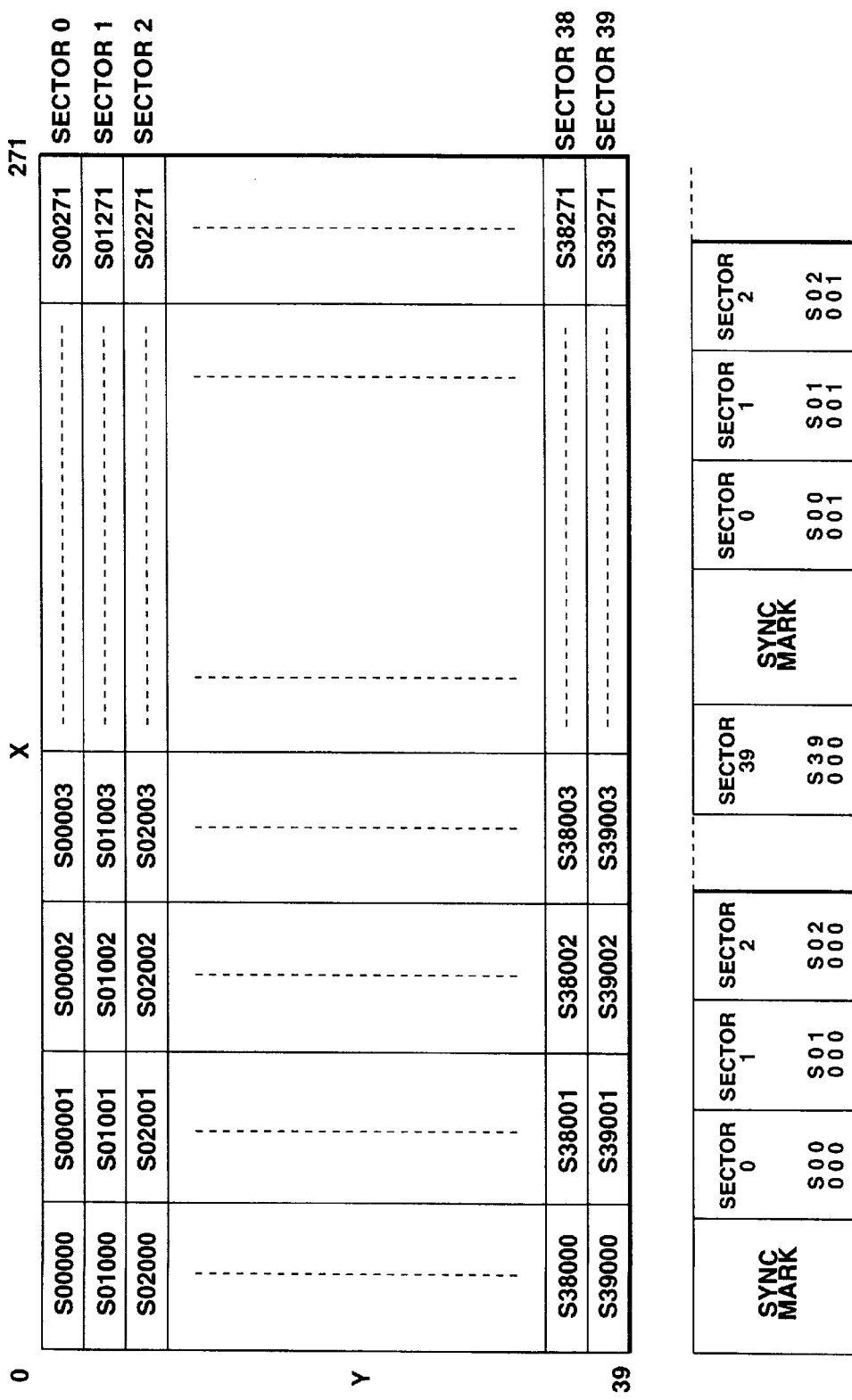
FIG. 2 is a diagram showing the data structure of the data recorded in the embodiment shown in FIG. 1 on a memory in a card reader/writer.

FIG. 1 shows an embodiment in that data is recorded in one-bit sectors in one frame. FIG. 2 shows a data structure on a memory in a card reader/writer (not shown) of data to be recorded in the embodiment shown in FIG. 1.

Description will be made of an MFM-RZ (modified frequency modulation-return to zero) modulation system with reference to FIG. 3.

The MFM-RZ modulation system is a modulation system to generate a pulse in a polarity reversion position of an MFM (modified frequency modulation) system.

When data shown in FIG. 3(a) is modulated, the MFM system reverses a polarity at a bit midpoint of data "1" and a bit division position where data "0" is continuous as shown in FIG. 3(b).

Accordingly, the MFM-RZ modulation system produces a pulse at the polarity reversion position of FIG. 3(b) as shown in FIG. 3(c).

And, a conventionally used NRZI-RZ (nonreturn-to-zero change on 1-return to zero) modulation system is a modulation system (see FIG. 3(e)) which generates a pulse at a polarity reversion position of an NRZI (nonreturn-to-zero change on 1) modulation system (see FIG. 3(d)).

When data "0" is continuous, the NRZI-RZ modulation system does not generate a pulse, while the MFM-RZ modulation system generates a pulse between at least two recording intervals.

Therefore, when data with continuous repeated "0" is reproduced, the NRZI-RZ modulation system cannot distinguish the region having the continuous data "0" from an unrecorded region, while the MFM-RZ modulation system can distinguish.

To record data in one-bit sectors in one frame as shown in FIG. 1(a), data is stored on the memory in a reader/writer (not shown) as shown in FIG. 2, in which data of sector 0 is arranged in direction X, and data of sector 0 to data of sector 39 are arranged in order of increasing number in direction Y.

When data of sector 0, e.g., data of S00000="1" and S00001="0", are recorded in an unrecorded card, data are recorded by the NRZI-RZ modulation system as shown in FIG. 1(b). The NRZI-RZ modulation system is used because the sector is composed of one bit in one frame, data is not recorded continuously and data "0" is not continuous.

To record data of sector 1, namely data of S01000="1" and S01001="0", into the card having its sector 0 already recorded, data is also recorded by the NRZI-RZ modulation system, and before or after recording the data, the data recorded in sector 0 is reproduced, and a record pit is formed on a boundary between sector 0 and sector 1 as shown in FIG. 1(*c*) as required (when both data in sector 0 and sector 1 are When data is recorded as described above, in the same way as the MFM-RZ modulation system is used to record data, the presence or not of a record pit can be detected to judge between the unrecorded region and the recorded region of the optical memory card, and double writing in the optical memory card can be prevented.

Figure 5:
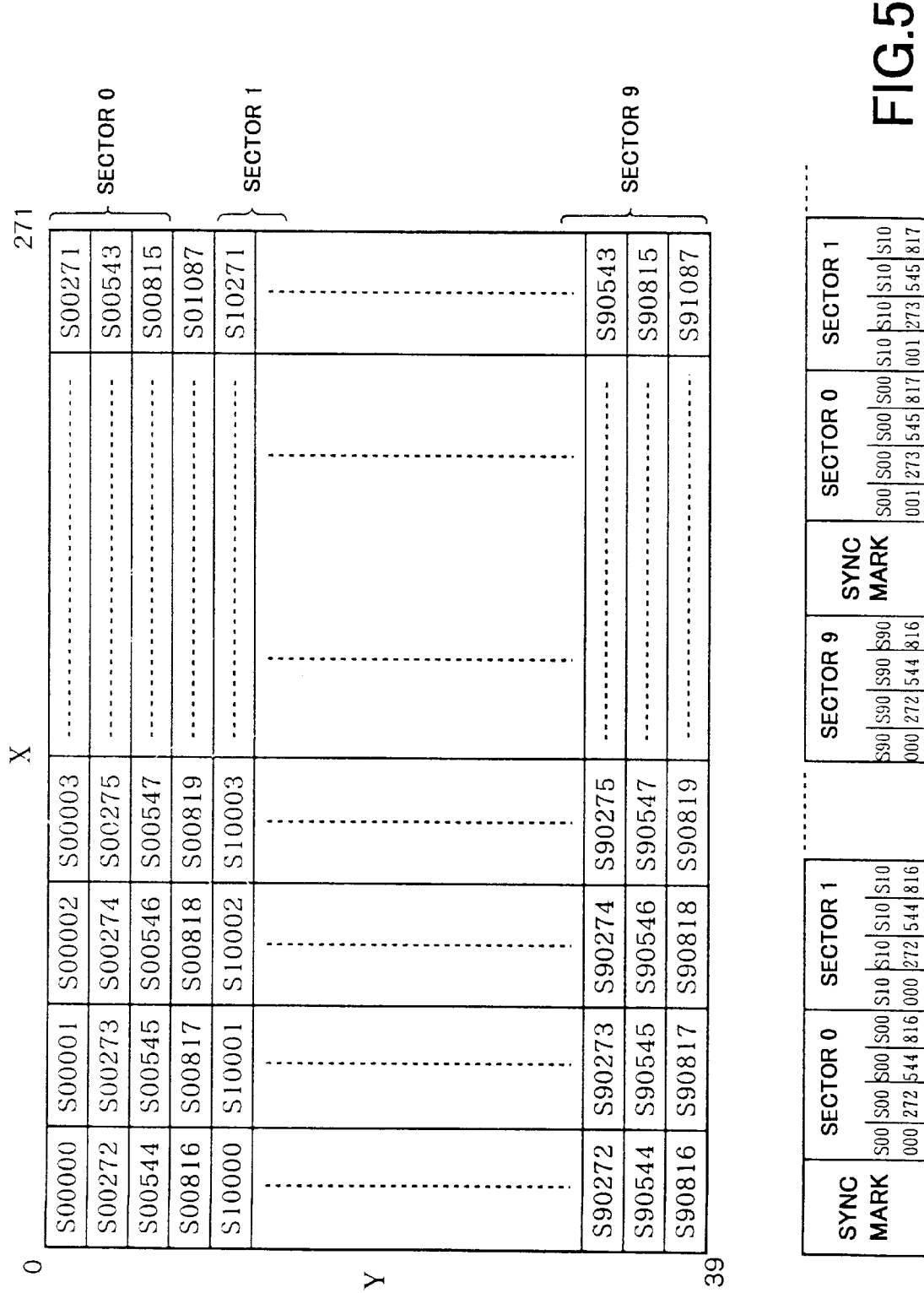
FIG. 5 is a diagram showing the data structure of the data recorded in the embodiment shown in FIG. 4 on the memory in the card reader/writer.

FIG. 4 shows an embodiment that data is recorded in multiple-bit sectors in one frame. FIG. 5 shows the structure of data, which is recorded in the embodiment shown in FIG. 4, on the memory within a card reader/writer (not shown).

To record data in four-bit sectors in one frame shown in FIG. 4(*a*), data is stored in the memory within the reader/writer (not shown) as shown in FIG. 5. In the card, data S00000, S00272, S00544 and S00816 with X=0 shown in FIG. 5 are recorded in sector 0 of the first frame shown in FIG. 4(*a*), and data S00001, S00273, S00545 and S00817 with X=1 as shown in FIG. 5 are recorded in sector 0 of the second frame as shown in FIG. 4(*a*).

To record data in four-bit sectors in one frame, the MFM-RZ modulation system is employed. In view of the structure of the sector, because data of at least four bits are continuously recorded within one frame. Recording of data of sector 0, e.g., data such as S00000="0", S00001="1", S00272="0", S00273="0", S00544="1", S00545="0", S00816="0" and S00817="0" in an unrecorded card is as shown in FIG. 4(*b*).

Then, when data of sector 1 is recorded on the card having sector 0 recorded, for example data of S10000="0", S10001="1", S10272="0", S10273="0", S10544="1", S10545="0", S10816="0" and S10817="0" are recorded as shown in FIG. 4(*c*).

In this case, data of sector 0 is also reproduced before or after recording data into sector 1 to form a record pit on a boundary between sector 0 and sector 1 as required so to have the same boundary between sector 0 and sector 1 as recorded by the MFM-RZ modulation system.

Figure 6:
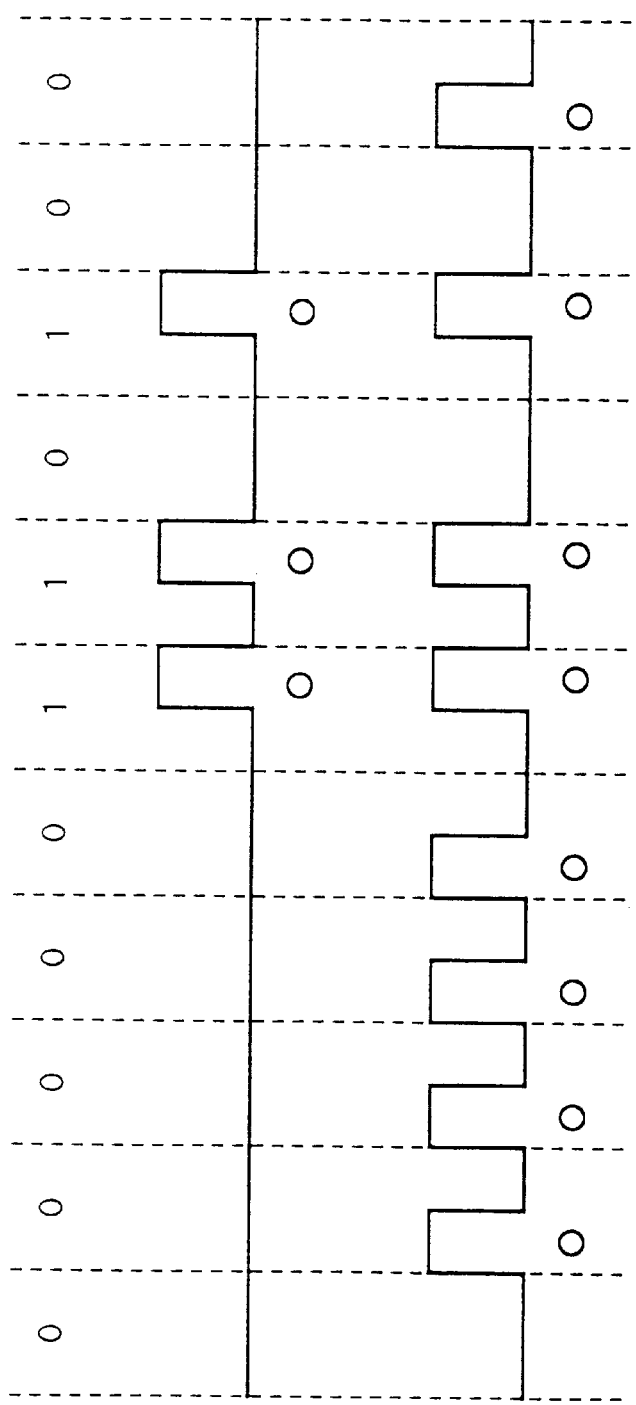
FIGS. 6(a) to 6(c) are diagrams showing one example of modifying a card recorded by an NRZI-RZ modulation system into recordation by the MFM-RZ modulation system.
Figure 7:
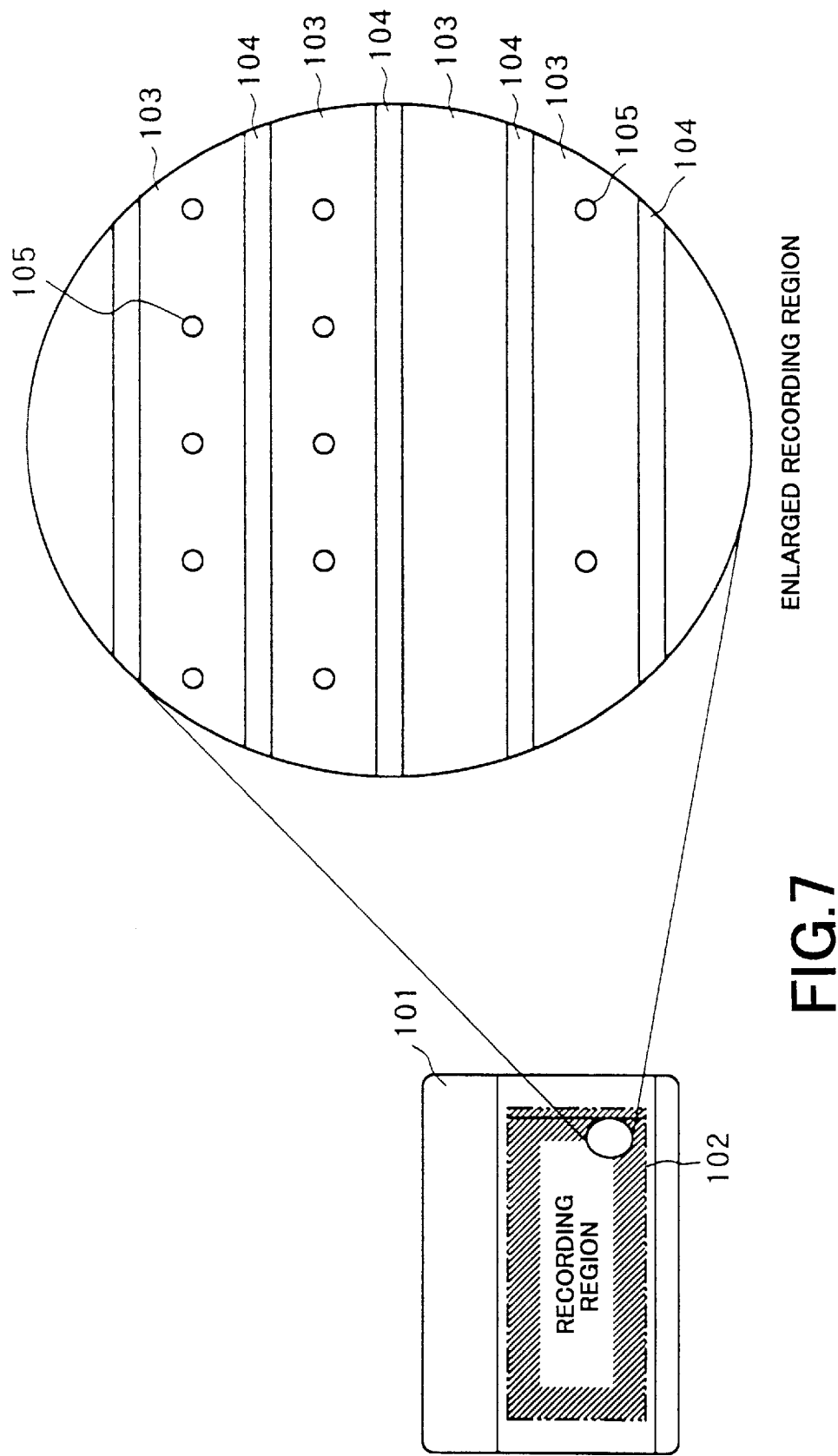
FIG. 7 is a diagram showing a recording region of an optical memory card.
Figure 8:
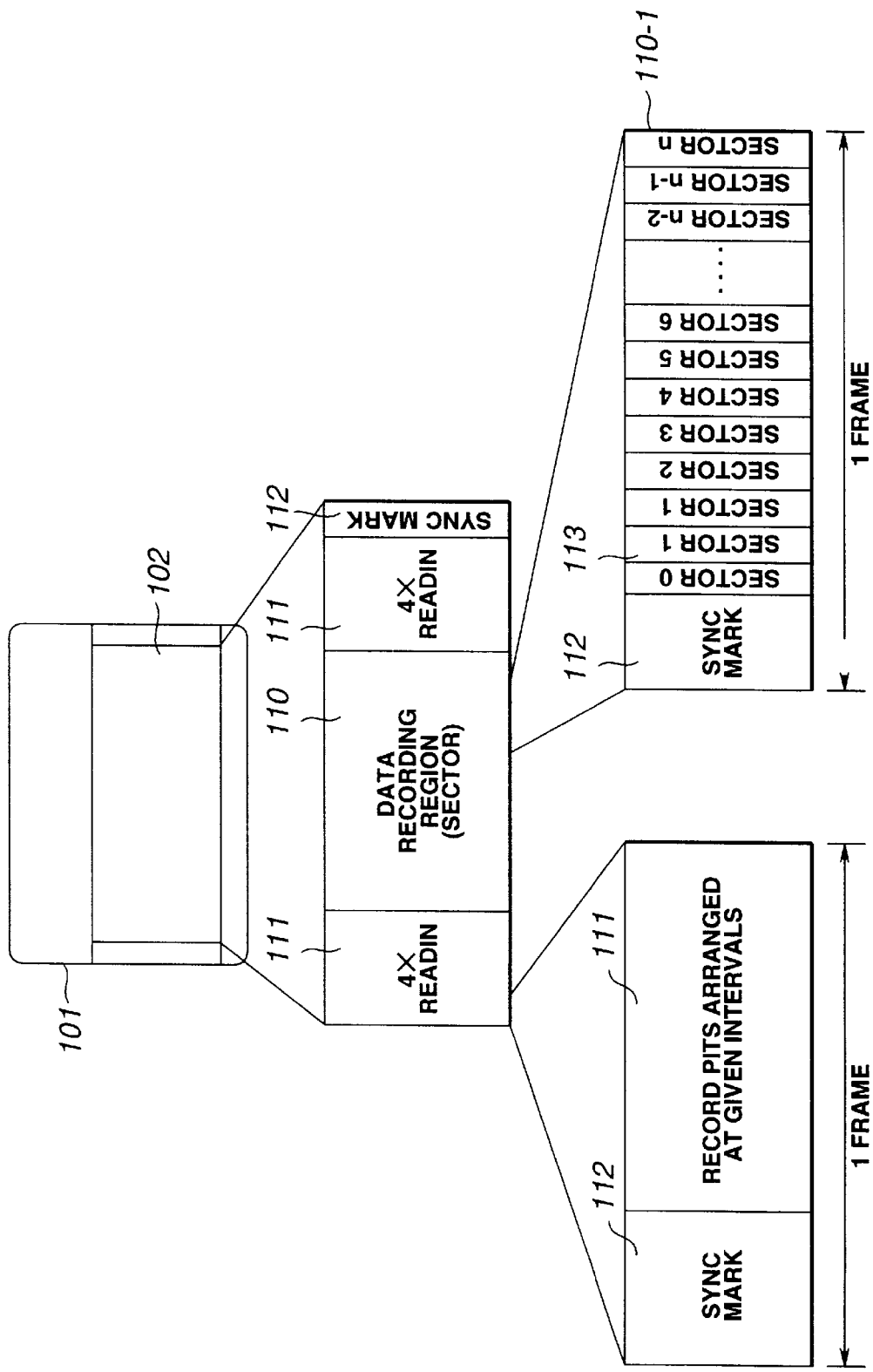
FIG. 8 is a diagram showing a logical data structure in a recording region.

FIG. 6 shows an example that a card recorded by the NRZI-RZ modulation system is modified so to be recorded by the MFM-RZ modulation system.

When the card recorded by the NRZI-RZ modulation system is modified so to be recorded by the MFM-RZ modulation system, the original card recorded by the NRZI-RZ modulation system can be modified to adopt the MFM-RZ modulation system (same as the MFM-RZ modulation system) by the same method even if data are discontinuous as in the one-bit sectors in one frame or data are continuous as in the sectors of a plurality of bits in one frame.

Data "00000110100" as shown in FIG. 6(*a*) becomes a signal to generate a pulse at a bit midpoint of data "1" as shown in FIG. 6(*b*) by the NRZI-RZ modulation system, and a record pit is formed on the card so to correspond to the position where the pulse is generated.

Data shown in FIG. 6(*a*) also becomes a signal to generate a pulse at a bit midpoint of data "1" and at the position of a bit breakpoint when data "0" is continuous by the MFM-RZ modulation system as shown in FIG. 6(*c*).

It is apparent from FIG. 6(*b*) and FIG. 6(*c*) that to change the record made by the NRZI-RZ modulation system into one made by the MFM-RZ modulation system, it is done satisfactorily by additional formation of a record pit at the position of a bit breakpoint when data "0" is continuous.

Therefore, the unillustrated card reader/writer reproduces the card which was recorded by the NRZI-RZ modulation system and forms a record pit on the card by the MFM-RZ modulation system to record data, so that the NRZI-RZ modulation system can be changed to the MFM-RZ modulation system.

And, the unillustrated card reader/writer detects the presence or not of a record pit in view of the reproduced signal to judge between the unrecorded region and the recorded region of the optical memory card and extracts a synchronization component from the reproduced signal as a data signal. But, the record pit formed when the NRZI-RZ modulation system is changed to the MFM-RZ modulation system is not included in the synchronization component and does not affect on the data signal. Therefore, the card modified to the MFM-RZ modulation system can also be reproduced by a card reader/writer of the NRZI-RZ modulation system.

INDUSTRIAL APPLICABILITY

The invention can be applied to a data recording method and device for an optical memory card. The invention is configured to record data to form at least one record pit between two data records in a recording region of the optical memory card and has an improved function for judging between a unrecorded region and a recorded region of the optical memory card to facilitate prevention of double writing.

What is claimed is:

1. A method of recording data in an optical memory card, in which data is discontinuously recorded, by forming no more than one pit in each sector of the optical memory card, the method comprising the steps of:

storing data to be written in a memory;

using NRZI-RZ modulation to write data from the memory into contiguous sectors that comprise a frame by recording one bit per sector; and successively forming a pit in contact with a boundary between a first sector and an immediately adjacent sector as long the memory shows that both the first sector and the immediately adjacent sector contain data and the data for both sectors results in no pit being formed according to NRZI-RZ modulation, the pit being formed at the boundary within the immediately adjacent sector, thereby ensuring that no overwriting of data occurs.

2. A method of recording data in an optical memory card, in which data is discontinuously recorded, by forming a plurality of pits in each sector of the optical memory card, the method comprising:

storing data to be written in a memory;

using MFM-RZ modulation to write data from the memory into contiguous sectors in the frame by recording more than one bit per sector; and successively forming a pit in contact with a boundary between a first sector and an immediately adjacent sector as long the memory shows that both the first sector and the immediately adjacent sector contain data and the data for the most significant bit of the first sector and the least significant bit of the immediately adjacent sector both result in no pit being formed according to MFM-RZ modulation, the pit being formed at the boundary within the immediately adjacent sector, thereby ensuring that no overwriting of data occurs.

3. A device for recording data in an optical memory card, in which data is discontinuously recorded, by forming no more than one pit in each sector of the optical memory card, the device comprising:

means for storing data to be written means for modulating the data by an NRZI-RZ modulation system to record the data in each sector in a frame, one bit per sector;

means for successively forming a pit in contact with a boundary between a first sector and an immediately adjacent sector as long the stored data shows that both the first sector and the immediately adjacent sector contain data and the data for both sectors results in no pit being formed according to NRZI-RZ modulation, the pit being formed at the boundary within the immediately adjacent sector, thereby ensuring that no overwriting of data occurs.

4. A device for recording data in an optical memory card, in which data is discontinuously recorded, by forming a plurality of pits in each sector of the optical memory card, the method comprising:

means for storing data to be written;

means for using MFM-RZ modulation to write data from the memory into contiguous sectors in the frame by recording more than one bit per sector; and means for successively forming a pit in contact with a boundary between a first sector and an immediately adjacent sector as long the memory shows that both the first sector and the immediately adjacent sector contain data and the data for the most significant bit of the first sector and the least significant bit of the immediately adjacent sector both result in no pit being formed according to MFM-RZ modulation, the pit being formed at the boundary within the immediately adjacent sector, thereby ensuring that no overwriting of data occurs.

* * * * *